Jan. 11, 1966  P. F. BROWN ETAL  3,228,456
METHOD AND APPARATUS EMPLOYING HOLLOW POLYFLUORINATED PLASTIC
FILAMENTS FOR HEAT EXCHANGE
Filed March 1, 1965

INVENTORS
PETER F. BROWN
MARTVAL J. HARTIG

BY Norbert F. Reinert

ATTORNEY

United States Patent Office 3,228,456
Patented Jan. 11, 1966

3,228,456
METHOD AND APPARATUS EMPLOYING HOLLOW POLYFLUORINATED PLASTIC FILAMENTS FOR HEAT EXCHANGE
Peter F. Brown and Martval J. Hartig, Wilmington, Del., assignors to E. I. du Pont de Nemours and Company, Wilmington, Del., a corporation of Delaware
Filed Mar. 1, 1965, Ser. No. 440,349
8 Claims. (Cl. 165—1)

This application is a continuation-in-part of our copending application Serial No. 220,757 filed August 31, 1962, now abandoned.

This invention relates to a method and apparatus for transferring heat between fluid masses having an overall temperature difference across the walls of very fine sized organic polymeric hollow filaments.

In the vast majority of heat transfer cases met in industrial practice, heat is transferred from one fluid through a solid wall to another fluid. The solid wall heretofore has commonly been in the form of tubing composed of a metallic substance such as a ferrous base metal, aluminum, cupronickel, etc. Although such metals generally exhibit good heat conductivity, they have been found to suffer from a number of shortcomings which make them less than ideal in use. The most serious shortcoming of metal tubing for heat exchanger service is their susceptibility to corrosion, particularly in the case of carbon steel tubing which, from cost considerations, is presently the most common metal used. The corrosive problem to metal tubing in heat exchanger service has been greatly intensified in recent years due to the restricted availability of good water which has forced the use of corrosive waters, such as brackish water and sea water for many heat exchange applications for which many inexpensive metals cannot be used with satisfactory results. Of course, in addition to this condition, there are many other special heat exchange cases involving inherently corrosive environment demanding the use of expensive metals, glass or ceramics, and the list of such special heat exchange cases is rapidly enlarging with the advancement of industrial technology. Furthermore, metal tube exchangers are relatively difficult to fabricate so that flexibility in design is restrictive and investment cost is quite high due to the time required in fabrication. Moreover, exchangers employing metal tubing for most industrial heat exchange requirement are heavy pieces of equipment and of relatively large size and cumbersome to install.

It is an object of the present invention to provide a method and apparatus for exchanging heat between fluid masses characterized by a much larger exchange surface per unit volume of exchanger than those previously designed for industrial practice.

It is a further object of the present invention to provide a method and apparatus for heat exchange which exhibits outstanding service in corrosive environments.

It is a further object of the present invention to provide heat exchanger apparatus which is relatively simple and inexpensive to fabricate and which permits wide flexibility in exchanger design.

It is still a further object of the present invention to provide heat exchanger apparatus which is light in weight and of more compact size compared to previous apparatus for a comparable heat exchange requirement.

The above and other objects are realized in accordance with the present invention by carrying out the transfer of heat between fluid masses using very fine sized hollow organic polymer plastic filaments.

The present invention contemplates providing a method of transferring heat between two fluid passes comprising passing a fluid mass through the interior of a plurality of polymeric organic hollow filaments of a size ranging from 5 to 275 mils external diameter with a wall thickness ranging from 0.5 to 30 mils while contacting the outer surface of said hollow filaments with a fluid mass having an over-all temperature difference from the fluid mass passing through the interior of said hollow filaments whereby heat is transferred across the walls of said hollow filaments. In executing the novel method of the invention, it is preferred to utilize a very large number of relatively short open-end hollow filaments preferably having a length in the range of from 0.5 to 20 feet; said filaments being arranged in a compact array with carefully controlled spacing wherein each set of ends of said hollow filaments are open to a separate chamber and these open ends are sealed into separate chambers and sealed from the outside of said hollow filaments. Separate masses of fluids are then passed through the hollow filaments and outside of the hollow filaments to effect an exchange of heat between the fluid masses. The term "fluid" as used herein is intended to include both liquids and gases and it is to be understood that the method of the invention contemplates that the fluid masses between which heat is transferred may be the same or different including the case where one fluid mass is present as a liquid while the other fluid mass is present as a gas such as represented by conventional aircooled exchangers. In heat exchange cases where liquids are to be passed through the interior of the plastic tubing, it will be obvious, in view of the small cross section of the tubes, that the method of the invention is more satisfactorily practiced on low viscosity liquids.

It is highly surprising that tubing composed of organic polymers can be used efficiently in heat exchangers in view of the known low thermal conductivity of plastics, which ranges in the order of from several hundred to several thousand times less than metals commonly used in heat exchanger construction depending upon the particular plastic under consideration. Unexpectedly, however, in the case of polymeric organic hollow filament heat exchange devices, it has been found that the critical design consideration is seldom heat transfer coefficient but much more often is fluid flow considerations and by employing a very large number of very small diameter hollow filaments having thin walls in a compact arrangement, a heat exchange structure may be realized having a large aggregate area of exchange surface permitting high quality relatively expensive plastic to replace the least expensive carbon steel heat exchangers in service today for many heat transfer applications.

The hollow filaments for the method of the invention may be made from any thermoplastic or other type of organic polymer which can be produced in hollow form, such as by the process disclosed in U.S. Patent 2,999,296 and French Patent 990,726. The walls of these hollow filaments are nonporous and because of their very minute diameter and cylindrical configuration these filaments allow for highly usable strength for design in spite of the fact that the allowable design stresses in plastics are an order of magnitude less than for metals on a volume basis. The choice of the particular organic polymer will, of course, be based on the chemical nature of the fluid masses used, the stability and physical properties of the polymer at the operating temperatures desired, relative cost of the polymer, and on other considerations which will be obvious to those skilled in the art. Illustrative examples of organic polymers suitable as hollow filaments for the invention are polyfluorinated plastics such as polytetrafluoroethylene, polytrifluorochloroethylene, polyvinyl fluoride, copolymers of tetrafluoroethylene and hexafluoropropylene, copolymers of vinylidene fluoride and hexafluoropropylene. Preferred polymers from which hollow filaments for the method of the invention are prepared are the perfluorocarbon polymers, particularly copolymers of tetrafluoroethylene and hexofluoropropylene since these materials exhibit excellent stability and physical strength at elevated temperature coupled with a high degree of inertness to chemical attack. The polyfluorinated plastics, particularly the copolymers of tetrafluoroethylene and hexafluoropropylene are surpisingly resistant to scaling. This property, of course, is extremely important in view of the small diameters of the hollow filaments used in the present invention and, furthermore, in view of the adverse effect of scaling on the heat transfer properties of the polymeric filaments.

The size of the organic polymeric hollow filaments for the invention may range from 5 to 275 mils external diameter with a wall thickness of from 0.5 to 30 mils with a size in a range from 20 to 165 mils external diameter with a wall thickness of from 1 to 20 mils being preferred for most heat exchange applications. This is far removed from the sizes of metal tubing commonly used in heat exchangers which range from thickness of from 35 to 165 mils. Still other tubing now used in commercial exchangers range up to 4 to 6 inches external diameter.

It is to be understood that the particular design of heat exchanger device utilizing organic polymeric hollow filaments in accordance with the present invention may vary widely and depends primarily on the specific end use involved. However, for a better understanding of the invention the following description of a specific illustrative arrangement for mounting the hollow filaments in a compact array in a tube-in-shell type heat exchanger design is provided in conjunction with the appended patent drawings in which:

FIGURE 1 is an elevation view in section of such apparatus utilizing polymeric organic hollow filaments;

FIGURE 2 is a transverse cross-sectional view at plane 2—2 of FIGURE 1; and

FIGURE 3 is an enlarged showing of a fragment of a baffle plate of the apparatus.

In the apparatus, as more particularly illustrated in the accompanying drawings, 11 designates a cylindrical-shaped shell disposed in a horizontal plane having an inlet 18 and an outlet 19. Shell 11 may be made from a wide variety of materials of construction, such as iron, alloy steel, aluminum, plastic, etc., depending upon the type of fluids handled on the shell side of the exchanger and operating conditions employed. Detachable cap 12, having an inlet 20, and detachable cap 13, having an outlet 21, are attached rigidly to the left and right ends, respectively, of shell 11 by means of a plurality of threaded fasteners arrayed around a pair of flanges. Assembled within shell 11 are a plurality of polymeric organic hollow filaments 14 compactly arrayed with carefully controlled spacing in header plates 15 in a fluid-tight manner. Header plates 15, in turn, are clamped between detachable caps 12 and 13 and shell 11 in a manner to provide a fluid-tight seal at the flange interfaces. In this arrangement, therefore, hollow filaments 14 are open at both ends with each set of ends in open communication with separate chambers and these open ends are sealed into the separate chambers and sealed from the space in shell 11 surrounding the outside of the filaments. In fabricating header plates 15, hollow filaments 14 are first arranged in end alignment plates forming the structural part of header plates 15 having a multiplicity of bore openings of a loose sliding fit over filaments 14 providing the close spacing relationship desired for individual filament or hanks of filaments within shell 11. Filaments 14 are positioned in the end alignment plates so that the open ends thereof extend out beyond the extremity of each end plate. The extremities of the alignment plates are then sealed in a tough potting resin such as an epoxy resin or an equivalent plastic material to provide a leak-proof joint around filaments 14. Hollow filaments 14 are then cut off at the extremity of header plates 15.

At intervals along hollow filaments 14, baffle plates 16, shown in detail in FIGURE 2, are positioned within shell 11 having open spaces from left to right in FIGURE 1 alternately at the top and bottom of shell 11 so that the shell side fluid substantially follows the serpentine path indicated by the broken arrows shown in FIGURE 1. As shown in FIGURES 2 and 3, hollow filaments 14 gain support within shell 11 by passing through baffles 16, these baffles having bore openings 17 loosely fitting filaments 14, said openings conforming to the pattern of openings for filaments 14 in header plates 15. Since filaments 14 substantially fill the openings 17, only a negligible amount of leakage of fluid occurs through these openings. Baffle plates 16 may be metal, ceramic, or plastic depending on the fluid on the shell side to be handled and the operating conditions involved.

In operation of the above-described apparatus, a fluid mass to be heated or cooled is introduced into inlet 20 to the interior of cap 12 and flows through hollow filaments 14 into the interior of cap 13 and thence out of cap 13 by means of outlet 21 while, at the same time, a fluid mass at an over-all temperature different from the fluid mass flowing through the interior of hollow filaments 14 enters shell 11 by means of inlet 18 and flows substantially in the path indicated by the broken arrows within shell 11 on the outside of hollow filaments 14 to emerge from outlet 19 near the opposite end of shell 11.

The invention is further illustrated by the following working examples.

*Example 1*

A heat exchanger similar to the foregoing described apparatus employing hollow filaments of a copolymer of tetrafluoroethylene and hexafluoropropylene 6 feet long having a size of 80 mils external diameter with a 6 mils wall thickness offering 400 square feet of exchange surface was used to cool spent 70% sulfuric acid from 300° F. to 100° F. with water introduced into the shell side of the exchanger at a temperature of approximately 80° F. Over-all heat transfer rate was in the range of 70 to 100 B.t.u./hr./sq. ft./° F. comparable to that obtained with a cross flow carbon-tube cooler but with advantages in cost, size, and weight an order of magnitude over the carbon-tube cooler.

*Example 2*

A reboiler for the concentration of 50% nitric acid containing heavy metals to 70% under reduced pressure was constructed from hollow filaments of a copolymer of tetrafluoroethylene and hexafluoropropylene. The hollow filaments were 20 mils O.D. with 2 mils walls. The heads and boiler body were constructed of titanium and the tubes cemented in the heads with a high melting wax of tetrafluoroethylene. Fifteen pound steam in the tubes was the source of heat and the evaporation was carried out at 50 mm. Hg absolute. The exchanger had 30 square feet of exchanger surface. The over-all coefficient of heat transfer was 420 B.t.u./hr./sq. ft./° F. The only satisfactory material for this in metal is titanium and this exchanger with polyfluorocarbon tubes was cheaper and more resistant to corrosion.

*Example 3*

Twenty-five tubes of a copolymer of tetrafluoroethylene and hexafluoropropylene, each 10 inches long, having an outside diameter of 0.1 inch and a wall thickness of 0.01 inch, are mounted in a square array, five vertical rows and five horizontal rows, the spacing between tubes being 1 inch. The array is mounted in a boiler.

A saturated solution of calcium sulfate at a temperature of about 80° C. is added to the boiler until all the tubes are immersed. Steam at 15 p.s.i.g. is passed through the tubes and the temperature of the calcium sulfate solution rises to 100° C., a temperature sufficient to cause boiling. The boiler is operated in this manner for 7 hours; the steam is then shut; and the solution is drained from the boiler.

Scaling on the surfaces of the tubes is noted. Based on a wall resistance of 0.00845 hr./° C./sq. ft./PCU, the original heat transfer coefficient of the polymeric tubes is 118 PCU/hr./° C./sq. ft. However, due to the scaling, this coefficient decreases to 111 PCU/hr./° C./sq. ft., a decrease of 6%.

In Control A, Example 3 is repeated using polyethylene tubes having the same outside diameter and wall thickness. The thickness of the scale formed after the same 7-hour period is over 10 times the thickness of the scale formed in the Example. The original heat transfer coefficient of about 118 PCU/hr./° C./sq. ft. is reduced to 75.5 PCU/hr./° C./sq. ft., a reduction of 36%. Substantially identical results are obtained when nylon tubes are substituted for the polyethylene tubes.

It is believed obvious from the above working examples that the novel method of the invention is capable of offering economical and outstanding performance for many of the myriad of heat transfer applications practiced in industry today in tube-in-shell type exchangers as well as in air-cooled exchangers, cooling towers, and the like; being particularly outstanding where corrosive water or very corrosive materials must be handled. Moreover, certain industrial heat exchange applications considered now economically impractical in materials of construction currently employed in exchangers may become commercially feasible in exchangers utilizing plastic hollow filaments. In addition to such industrial applications, heat exchangers in numerous different designs employing very fine sized polymeric organic hollow filaments may be made applicable to many consumer items especially where air cooling or heating are involved, such as in home heating units and air conditioning equipment, and automobile radiators and heaters.

Since obviously many different embodiments of the invention may be made without departing from the spirit and scope thereof, it is to be understood that the invention is not limited by the specific illustrations except to the extent defined in the following claims.

We claim:

1. A method of transferring heat between two fluid masses comprising passing a fluid mass through the interior and directly in contact with the inner plastic surfaces of a plurality of hollow filaments of a polyfluorinated plastic having a size ranging from 5 to 275 mils outside diameter with a wall thickness ranging from 0.5 to 30 mils and directly contacting substantially the entire outer plastic surfaces of said hollow filaments with a fluid mass having an over-all temperature difference from the fluid mass passing through the interior of said hollow filaments.

2. A method as in claim 1 wherein said polyfluorinated plastic is a polymer of tetrafluoroethylene.

3. A method as in claim 1 wherein said polyfluorinated plastic is a copolymer of tetrafluoroethylene and hexafluoropropylene.

4. A method of transferring heat between two fluid masses having an over-all temperature difference comprising passing a fluid mass through the interior and directly in contact with the inner plastic surfaces of a plurality of hollow filaments of a polyfluorinated plastic having a size ranging from 20 to 165 mils outside diameter with a wall thickness ranging from 1 to 20 mils and directly contacting substantially the entire outer plastic surfaces of said hollow filaments with a fluid mass having an over-all temperature difference from the fluid mass passing through the interior of said hollow filaments.

5. A heat exchanger comprising a shell; a plurality of hollow fluid-tight filaments of a polyfluorinated plastic having a size ranging from 5 to 275 mils outside diameter with a wall thickness ranging from 0.5 to 30 mils; means for securing the ends of said filaments in fixed relationship with said shell; means for passing one fluid through the interiors of said hollow filaments; and means for passing a second fluid about the outer surfaces of said hollow filaments.

6. A heat exchanger as in claim 5 wherein said hollow filaments have a size ranging from 20 to 165 mils outside diameter with a wall thickness ranging from 1 to 20 mils.

7. A heat exchanger as in claim 5 wherein said polyfluorinated plastic is a polymer of tetrafluoroethylene.

8. A heat exchanger as in claim 5 wherein said polyfluorinated plastic is a copolymer of tetrafluoroethylene and hexafluoropropylene.

References Cited by the Examiner

UNITED STATES PATENTS

| 1,159,775 | 11/1915 | Kerr | 165—111 |
| 2,433,546 | 12/1947 | Cornelius | 165—180 |
| 2,753,435 | 7/1956 | Jepson | 165—46 |
| 3,039,453 | 6/1962 | Andrassy | 165—171 |
| 3,063,882 | 11/1962 | Cheshire | 165—46 |

OTHER REFERENCES

Publication: "Journal of Teflon," vol. 2, No. 11, November 1961, published by Du Pont.

ROBERT A. O'LEARY, *Primary Examiner.*

CHARLES SUKALO, *Examiner.*